(12) United States Patent
Wang et al.

(10) Patent No.: US 12,417,537 B2
(45) Date of Patent: Sep. 16, 2025

(54) METHOD FOR IMAGE ANALYSIS OF PREDICTED CELL METASTASIS

(71) Applicant: National Chung Cheng University, Chiayi (TW)

(72) Inventors: Hsiang-Chen Wang, Chiayi (TW); Jen-Feng Hsu, Chiayi (TW); Yao-Kuang Wang, Kaohsiung (TW); I-Chen Wu, Kaohsiung (TW)

(73) Assignee: NATIONAL CHUNG CHENG UNIVERSITY, Chiayi County (TW)

( * ) Notice: Subject to any disclaimer, the term of this patent is extended or adjusted under 35 U.S.C. 154(b) by 301 days.

(21) Appl. No.: 18/231,409

(22) Filed: Aug. 8, 2023

(65) Prior Publication Data

US 2025/0029252 A1 Jan. 23, 2025

(30) Foreign Application Priority Data

Jul. 17, 2023 (TW) .................................. 112126593

(51) Int. Cl.
*G06T 7/00* (2017.01)
(52) U.S. Cl.
CPC .. *G06T 7/0014* (2013.01); *G06T 2207/10036* (2013.01); *G06T 2207/30092* (2013.01); *G06T 2207/30096* (2013.01)
(58) Field of Classification Search
CPC ....... G06T 7/0014; G06T 3/40; G06V 10/754; G06V 10/76
See application file for complete search history.

(56) References Cited

FOREIGN PATENT DOCUMENTS

WO WO-2022157674 A1 * 7/2022 .......... G01N 33/587

OTHER PUBLICATIONS

Wang, Jing, Jun Zhou, and Weiqing Huang. "Attend in bands: Hyperspectral band weighting and selection for image classification." IEEE Journal of Selected Topics in Applied Earth Observations and Remote Sensing 12.12 (2020). (Year: 2020).*
Tsai, Cho-Lun, et al. "Hyperspectral imaging combined with artificial intelligence in the early detection of esophageal cancer." Cancers 13.18 (2021). (Year: 2021).*

(Continued)

*Primary Examiner* — Matthew C Bella
(74) *Attorney, Agent, or Firm* — WPAT, PC (57) ABSTRACT

A method for image analysis of predicted cell metastasis is provided. A host performs principle component analysis (PCA) for analysis and conversion of reference images into hyperspectral image information. Then an image capture unit sends input images to the host. The host converts the input images into hyperspectral images according to the hyperspectral image information and gets spectral information of the hyperspectral images. Next the host selects a plurality of wave bands corresponding to esophageal cancer cells and performs feature computation of the spectral information to generate corresponding features images. Then the host performs convolution of the feature images with kernels to get a convolution result. Later the host matches the convolution result with sample spectra of sample images to get a comparison result. Lastly the host determines whether metastasis of esophageal cancer cells occurs according to the comparison result.

9 Claims, 9 Drawing Sheets

(56) References Cited

OTHER PUBLICATIONS

Tsai, Tsung-Jung, et al. "Intelligent identification of early esophageal cancer by band-selective hyperspectral imaging." Cancers 14.17 (2022). (Year: 2022).*

Lorenzo, Pablo Ribalta, et al. "Hyperspectral band selection using attention-based convolutional neural networks." IEEE Access 8 (2020). (Year: 2020).*

Huang, Hung-Yi, et al. "Classification of skin cancer using novel hyperspectral imaging engineering via YOLOv5." Journal of Clinical Medicine 12.3 (2023) (Year: 2023).*

* cited by examiner

METHOD FOR IMAGE ANALYSIS OF PREDICTED CELL METASTASIS

FIELD OF THE INVENTION

The present invention relates to an image analysis method, especially to a method for image analysis of predicted cell metastasis.

BACKGROUND OF THE INVENTION

Esophageal cancer is among the ten most common cancers worldwide, especially in southeast Asia including Japan, Taiwan, etc. with higher incidence.

Esophageal cancer has two main types: esophageal squamous cell carcinoma (SCC) which arises from the epithelial cells lining the esophagus, and esophageal adenocarcinoma (AC) which arises from glandular cells present between a lower part of the esophagus and stomach. As to the incidence rate, America and Europe have particularly high incidence rate while most of SCC cases occur in Asia. Japan in Eastern Asia and Taiwan have the highest incidence rate of SCC. According to statistics of Ministry of Health and Welfare, cancer has been the leading cause of death for 40 decades in 2021. Among common cancers, esophageal cancer is the ninth leading cause of cancer death in Taiwan. Compared with a decade ago, the death rate is increased 1.7% and the number of deaths per 100,000 individuals is up to 439.

Like a lot of cancers, causes of esophageal cancer are still unclear. Yet there are a lot of risk factors associated with the esophageal cancer. The risk factors already known now include age (more middle-aged and elderly people), gender (more male), smoking, chewing of betel nuts, heavy drinking of alcohol, eating or drinking extremely hot food, corrosive injury caused by ingestion of strong alkali, nitrosamine in pickles, people ever had had head and neck cancers, and existing esophageal diseases including achalasia, reflux esophagitis, Barett's disease, Hiatal Hernia, Human papillomavirus (HPV) infection. etc.

At early stage, esophageal cancer doesn't have obvious symptoms. Along with formation of cancer cells, symptoms including dysphagia, abnormal mass, gastroesophageal reflux disease, hoarse voice, etc. appear and now most of patients in middle and late stages need to be treated by surgery. Compared with stomach, the esophagus doesn't have serosa for protection. Lymph vessels of the esophagus are distributed in lamina propria. The esophageal cancer is easy to have lymphatic metastasis which is an important mechanism in the spread of cancer cells. The cancer cells easily invade or spread to other organs and further lead to other complications. According to statistics, about 67% patients have multiple complications caused by metastasis after the surgery with a five-year survival rate of 15-47%.

The cause of death of patients with esophageal cancer is due to late diagnosis. Early-stage esophageal cancer is difficult to be found and diagnosed. Most patients don't go to the doctor until they have symptoms including dysphagia, pill impaction, chest pain, etc. The survival rate is less than 20% when the esophageal cancer is in the late stage. Moreover, the esophageal cancer is easy to have lymphatic metastasis. Once the cancer cells are spread to the lymph nodes, lung or other distal organs, the five-year survival rate is lower than 5% with poor prognosis.

Once the esophagus cancer is diagnosed at early and treated as soon as possible, the survival rate is up to about 70%~80% and patients without lymph node metastasis has the 5-year survival rate of 79.5% while the 5-year survival rate of patients with lymph node metastasis is 48.2%. Thereby whether the lymph node metastasis is detected is a key factor to long term survival after the surgery.

According to American Joint Commission on Cancer (AJCC) $7^{th}$ edition, there are 5 stages-stage 0 to stage 4 for esophageal cancer. The staging criteria include evaluation of cancer cell differentiation by test results, local invasion of cancer cells, the number of regional lymph nodes with metastasis, whether metastasis occurs, etc.

The esophageal cancer has 5 stages. Stage 0: Abnormal cells are found in basal cell layer of the mucosa; Stage 1: Tumor is limited to mucosae, and submucosa; Stage 2 is divided into stages 2A and 2B; Stage 2A: Tumor invades muscular layer or muscularis externa, without lymphatic metastasis; Stage 2B: With lymphatic metastasis yet tumor is limited to mucosae, submucosa, or muscular layer; Stage 3: tumor invades adjacent organs and tissues, or muscularis externa, with lymphatic metastasis; and Stage 4: tumor invades other organs or non-regional lymph nodes.

If esophageal cancer is suspected, biopsy samples obtained during an endoscopy are needed to confirm the diagnosis. Prevention includes stopping smoking and eating a healthy diet. Treatment is based on the cancer's stage and location, together with patient's physical and mental conditions and activities of daily living. Small localized squamous-cell cancers can be treated and cured with surgery. In most of patients, chemotherapy combined with radiation therapy is used together with surgery. Growth of larger tumors can be slowed by chemotherapy and radiation therapy. As to patients with metastasis or not fit for surgery, palliative care is recommended. Treatment outcomes are affected by the cancer itself and other diseases present. The prognosis of esophageal cancer is quite poor because most patients is diagnosed in advanced stages.

The endoscopic imaging system is commonly used for detection of esophageal cancer. Along with development of technology, research related to artificial intelligence combined with computer vision for medical tests has come out and applied to clinical practice. However, computed tomography (CT), positron emission tomography (PET), or biopsy should be used in order to determine whether the cancer has spread to other parts of the body. Thus there is room for improvement and there is a need to provide a model established for checking whether esophageal cancer has spread by using endoscopic images.

SUMMARY

Therefore, it is a primary object of the present invention to provide a method for image analysis of predicted cell metastasis which obtains feature images by operation of convolutional neural network (CNN) and performs matching between spectra of the feature images and spectra of sample images after selecting specific wave bands. Thereby whether esophageal cancer cells have spread to other parts of body is further determined.

In order to achieve the above object, a method for image analysis of predicted cell metastasis according to the present invention includes a plurality of steps. First performing principle component analysis (PCA) on a plurality of reference images and converting the reference images into hyperspectral reference images by a host. Also getting hyperspectral image information at the same time. Then sending input images to the host by an image capture unit, converting the input images into hyperspectral images according to the hyperspectral image information, and obtaining spectral information of the hyperspectral images by the host. Next selecting a plurality of wave bands corresponding to esophageal cancer cells and performing feature computation on the spectral information to generate feature images by the host. Later performing convolution of the feature images with kernels to get a convolution result by the host. Then carrying out matching between the convolution result and sample spectra of sample images to obtain a comparison result by the host. Lastly the host determines whether the esophageal cancer cells have spread to other parts of body. Thereby whether the esophageal cancer cells have metastasized can be determined only by images captured by endoscopes. Doctors can have accurate staging of different cancers and thus provide patients stage-appropriate treatment options.

Preferably, before the step of converting the input images into hyperspectral images according to the hyperspectral image information and obtaining spectral information of the hyperspectral images by the host, the present method further includes a step of performing data cleaning of the input images by the host.

Preferably, the step of performing convolution of the feature images with kernels to get a convolution result by the host further includes the steps of: performing at least one layer of convolution of the feature images to generate at least one feature map by the host; then performing a pooling operation according to the plurality of the feature maps to reduce size of the feature maps by the host; lastly performing a fully-connected operation according to the plurality of the feature maps for training the input image and getting weight value to obtain the convolution result by the host.

Preferably, the hyperspectral image information is a plurality of white light images corresponding to the input images and composed of a plurality of color matching functions (CMF), a correction matrix, and a conversion matrix.

Preferably, in the step of carrying out matching between the convolution result and sample spectra of sample images to obtain a comparison result by the host, the host reads the sample spectra of the sample images from a database and then matches the sample spectra with the convolution result.

Preferably, the sample spectra of the sample images are a plurality of spectra corresponding to the esophageal cancer cells of a plurality of endoscopic images.

Preferably, the sample spectra of the sample images include at least one sample spectrum of at least one image of metastatic esophageal cancer cells and at least one sample spectrum of at least one image of non-metastatic esophageal cancer cells.

Preferably, the comparison result is metastasis of the esophageal cancer cells when the convolution result is matched with the sample spectrum of the image of metastatic esophageal cancer cells; the comparison result is non-metastasis of the esophageal cancer cells when the convolution result is matched with the sample spectrum of the image of non-metastatic esophageal cancer cells.

Preferably, the wave bands include 415-450 nm, 500-560 nm, 590-620 nm, and 660-780 nm.

DETAILED DESCRIPTION

In order to learn features and functions of the present invention more clearly, please refer to the following embodiments with detailed description.

Conventional diagnosis of metastatic tumors involves computed tomography (CT), positron emission tomography (PET), and biopsy. The present invention provides a method for image analysis of predicted cell metastasis which is more convenient to use.

Features of an image analysis method applying wave bands to hyperspectral images according to the present invention together with a system used in combination with the method are further provided in the following embodiments.

Figure 1:
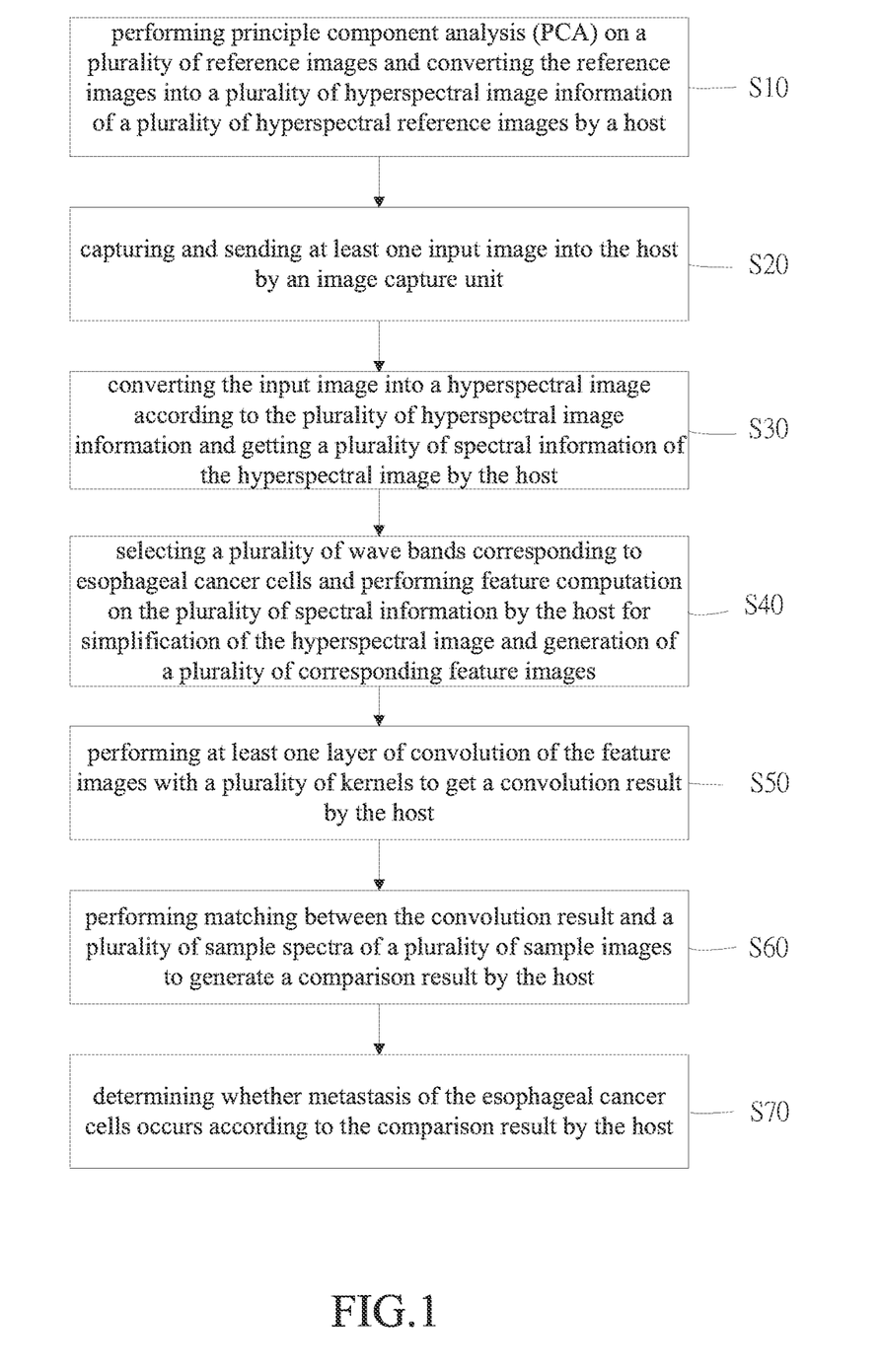
FIG. 1 is a flow chart showing steps of an embodiment according to the present invention.

Refer to FIG. 1, a flow chart showing steps of a method for image analysis of predicted cell metastasis according to the present invention is provided. As shown in the figure, a method for image analysis of predicted cell metastasis according to the present invention includes the following steps.

Step S10: performing principle component analysis (PCA) on a plurality of reference images and converting the reference images into a plurality of hyperspectral image information of a plurality of hyperspectral reference images by a host;

Step S20: capturing and sending at least one input image into the host by an image capture unit;

Step S30: converting the input image into a hyperspectral image according to the plurality of hyperspectral image information and getting a plurality of spectral information of the hyperspectral image by the host;

Step S40: selecting a plurality of wave bands corresponding to esophageal cancer cells and performing feature computation on the plurality of spectral information by the host for simplification of the hyperspectral image and generation of a plurality of corresponding feature images;

Step S50: performing at least one layer of convolution of the feature images with a plurality of kernels to get a convolution result by the host;

Step S60: performing matching between the convolution result and a plurality of sample spectra of a plurality of sample images to generate a comparison result by the host;

Step S70: determining whether metastasis of the esophageal cancer cells occurs according to the comparison result by the host.

Figure 2A:
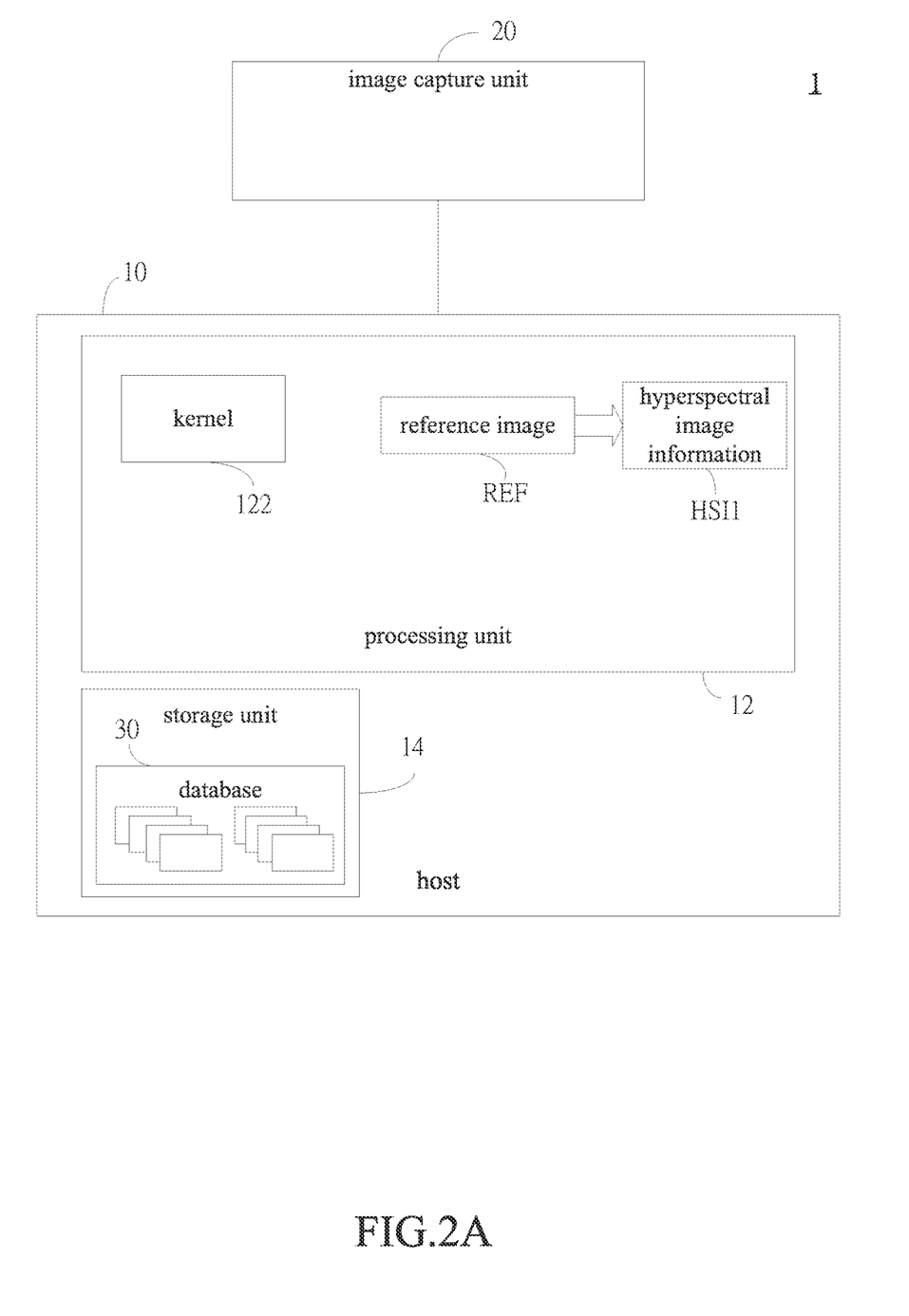
FIG. 2A-2D are schematic drawings showing a part of steps of an embodiment according to the present invention.
Figure 2B:
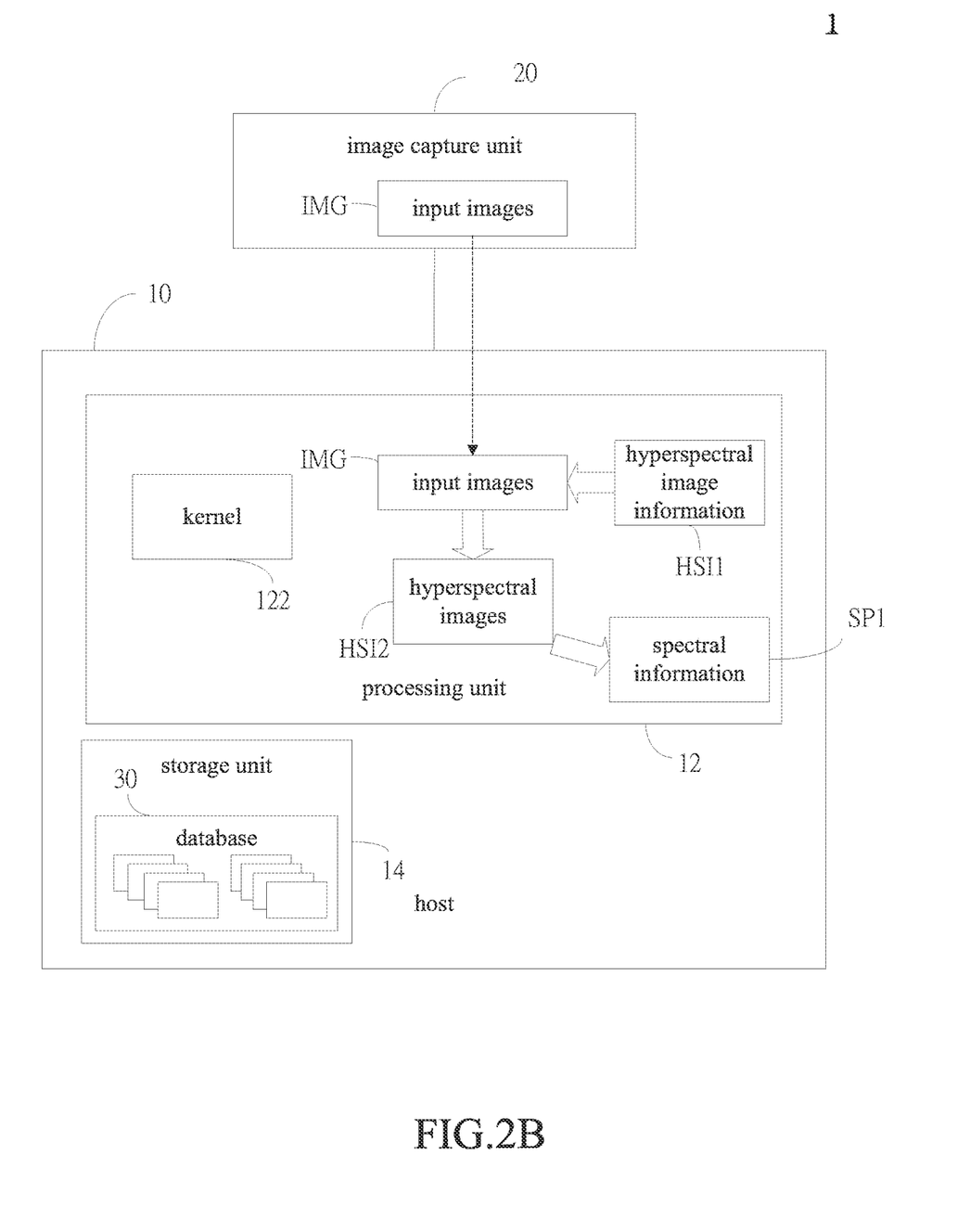
Figure 2C:
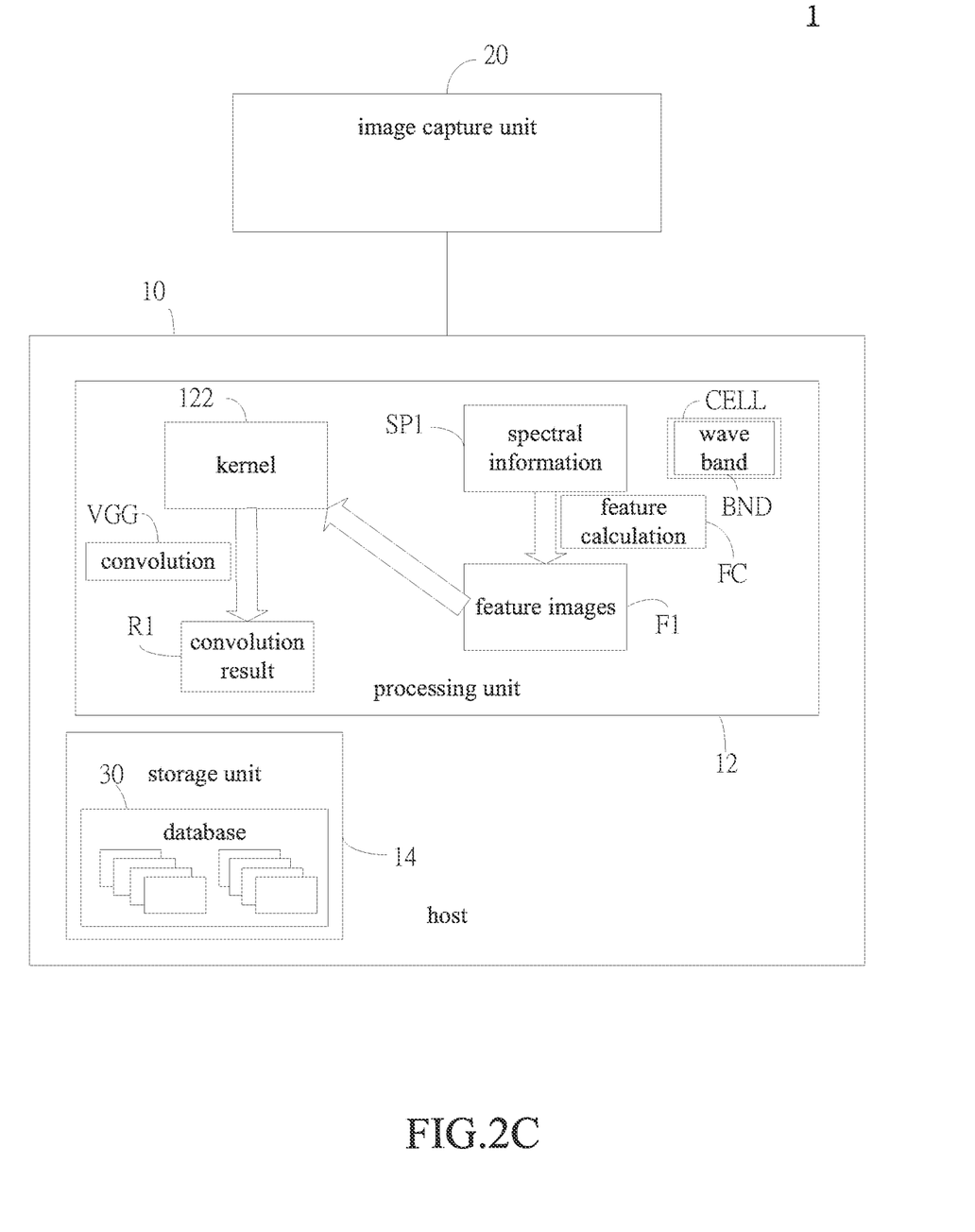
Figure 2D:
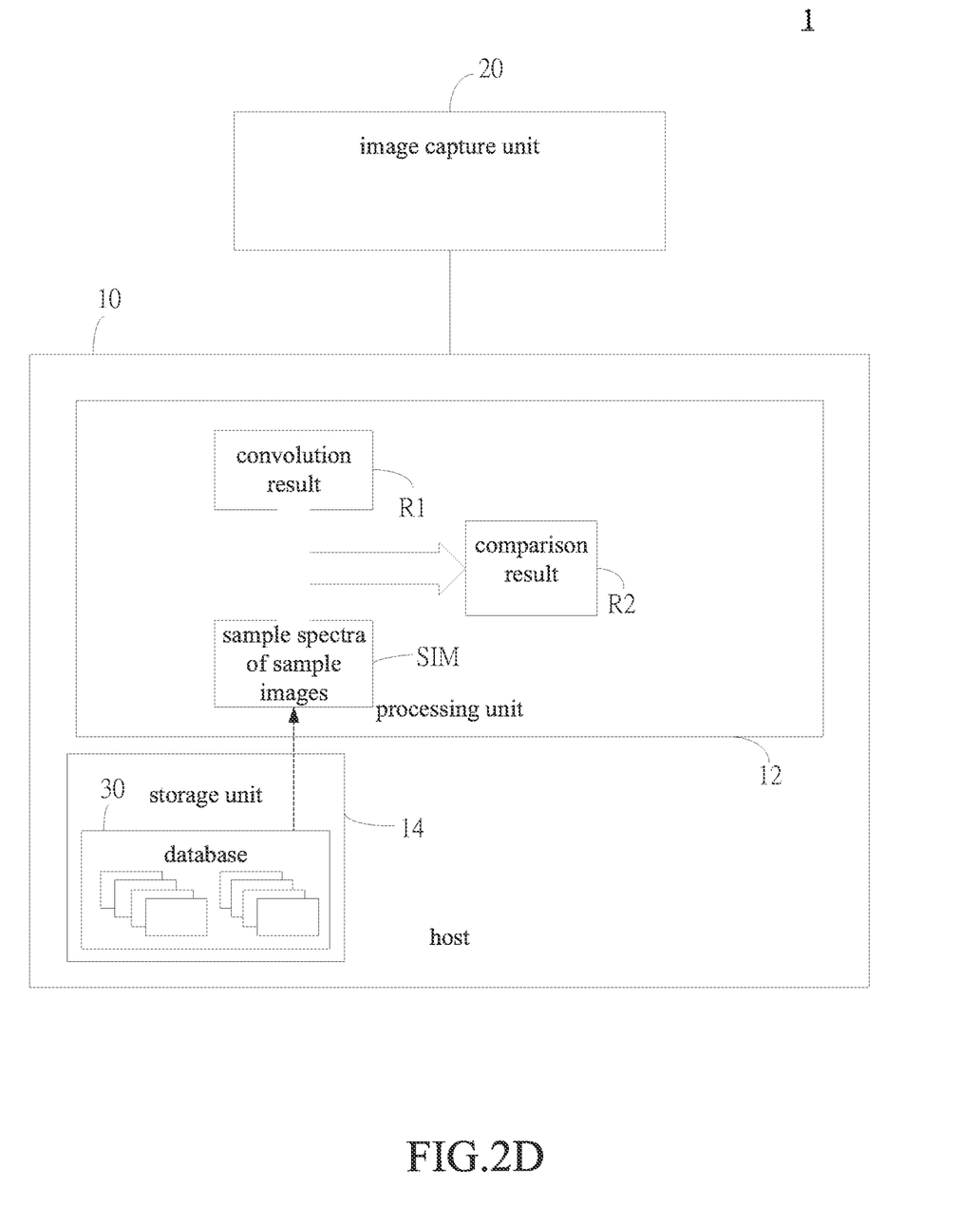

Refer to FIG. 2A and FIG. 2D, a method for image analysis of predicted cell metastasis according to the present invention is used in combination with an analysis system 1 which includes a host 10 and an image capture unit 20. In this embodiment, the host 10 is, but not limited to, a host computer composed of a processing unit 12 and a storage unit 14. The host 10 can also be servers, desktops, tablets, or electronic devices with computing capabilities. A database 30 is built in the storage unit 14 or is an external storage device of the host 10. A kernel 122 is mounted in the processing unit 12. In this embodiment, the image capture unit 20 is an endoscope used for observation and detection organs and tissues inside the body.

As shown in FIG. 2A, in the step S10, the host 10 reads a reference image REF corresponding to the image capture unit 20 and performs PCA on the reference image REF. The reference image REF can be white light image stored in the database 30 or a color chip of the ColorChecker (24 patch version) captured by the image capture unit 20. In this embodiment, the image capture unit 20 is a white-light endoscope of OLYMPUS EVIS LUCERA CV-260 SL which is used to obtain corresponding white-light reference images.

As shown in FIG. 2A, the host 10 gets a hyperspectral image information HSI1 according to the reference image REF. The image is converted from a general color space (color space of the captured image) to XYZ color space (CIE 1931 XYZ Color space) such as from sRGB color space to XYZ color space. The hyperspectral image information HSI1 in the present invention is corresponding to 24 ColorChecker (X-Rite Classic) which includes common primary colors in nature such as red, green, blue, and gray. The hyperspectral image information HSI1 is corresponding to the above white light images and composed of a plurality of color matching functions (CMF), a correction matrix C, and a conversion matrix M.

For conversion, first the reference image REF and the spectrometer (Ocean Optics-QE65000) are converted into the same XYZ color space. A conversion equation for the reference image REF is as the following:

$$\begin{bmatrix} X \\ Y \\ Z \end{bmatrix} = [M_A][T]\begin{bmatrix} f(R_{sRGB}) \\ f(G_{sRGB}) \\ f(B_{sRGB}) \end{bmatrix} \times 100, 0 \leq \begin{matrix} R_{sRGB} \\ G_{sRGB} \\ B_{sRGB} \end{matrix} \leq 1 \quad \text{equation 1}$$

wherein $$[T] = \begin{bmatrix} 0.4104 & 0.3576 & 0.1805 \\ 0.2126 & 0.7152 & 0.0722 \\ 0.0193 & 0.1192 & 0.9505 \end{bmatrix} \quad \text{equation 2}$$

$$f(n) = \begin{cases} \left(\frac{n+0.055}{1.055}\right)^{2.4}, & n > 0.04045 \\ \left(\frac{n}{12.92}\right), & \text{otherwise} \end{cases} \quad \text{equation 3}$$

$$[M_A] = \begin{bmatrix} X_{SW}/X_{CW} & 0 & 0 \\ 0 & Y_{SW}/X_{CW} & 0 \\ 0 & 0 & Z_{SW}/Z_{CW} \end{bmatrix} \quad \text{equation 4}$$

$f(n)$ is gamma function able to convert sRGB values into linear RGB values, T is conversion matrix, and $[M_A]$ is chromatic adaptation transform matrix. According to the equation 1, the liner RGB values are converted into XYZ values in the XYZ color space $(XYZ_{Endoscope})$.

The followings are equations for conversion of reflection spectrum data captured by the spectrometer into the XYZ color space $$X = k\int_{380nm}^{780nm} S(\lambda) R(\lambda)\bar{x}(\lambda)d\lambda \quad \text{equation 5}$$

$$Y = k\int_{380nm}^{780nm} S(\lambda) R(\lambda)\bar{y}(\lambda)d\lambda \quad \text{equation 6}$$

$$Z = k\int_{380nm}^{780nm} S(\lambda) R(\lambda)\bar{z}(\lambda)d\lambda \quad \text{equation 7}$$

wherein, k is obtained by the following equation 8;

$$k = 100/\int_{380nm}^{780nm} S(\lambda)\bar{y}(\lambda)d\lambda \quad \text{equation 8}$$

$\bar{x}(\lambda)$, $\bar{y}(\lambda)$, $\bar{z}(\lambda)$ are color matching functions (CMF); $S(\lambda)$ is a light source spectrum of the endoscope for shooting. In the XYZ color space, Y value is proportional to the brightness. Thus the maximum Y (maximum brightness) of the light source spectrum is obtained by the equation 9. Then a brightness ratio k is further obtained by specifying the upper limit of the Y value as 100. The reflection spectrum data is converted into XYZ value $[XYZ_{Spectrum}]$ of the XYZ color space by the equations 5-7.

Moreover, use the correction matrix C in the following equation 9 to perform correction of endoscopic images.

$$[C] = [XYZ_{spectrum}] \times pinv([V]) \quad \text{equation 9}$$

A variance matrix [V] is given by analysis of factors that cause errors in endoscope including nonlinear response and dark current of the endoscope, inaccurate color separation and color shift (such as white balance) of filters. Thereby the XYZ value $[XYZ_{Spectrum}]$ is corrected.

Correction of the non-linear response is carried out by using third-order equation because white light images have similar results of third-order operation. Non-linear response of the endoscope is corrected by using the following equation 10.

$$V_{Non-linear} = [X^3\ Y^3\ Z^3\ X^2\ Y^2\ Z^2\ X\ Y\ Z\ 1]^T \quad \text{equation 10}$$

Generally, the dark current of the endoscope is a fixed value which is not changed significantly along with the changes in the amount of the light received. Thereby impact of the dark current is considered as a constant and a correction variance of the dark current is defined as VDark which is corrected by the following equation 11.

$$V_{Dark} = [\alpha] \quad \text{equation 11}$$

A correction variance of the inaccurate color separation and color shift of the filter is defined as $V_{Color}$ while $\bar{x}(\lambda)$, $\bar{y}(\lambda)$, and $\bar{z}(\lambda)$ are color matching functions for conversion of RGB color space to XYZ color space. According to correlation among $\bar{x}(\lambda)$, $\bar{y}(\lambda)$, and $\bar{z}(\lambda)$, all possibilities among X, Y, and Z are listed in the form of combinations, as shown in the following equation 12 for correction of inaccurate color separation and color shift of the filter.

$$V_{Color} = [XYZ\ XY\ XZ\ YZ\ X\ Y\ Z]^T \quad \text{equation 12}$$

The variance matrix V shown in the equation 13 below is obtained from the above equations 10-12:

$$V = [X^3\ Y^3\ Z^3\ X^2Y\ X^2Z\ Y^2Z\ XY^2\ XZ^2\ YZ^2\ XYZ\ X^2\ Y^2\ Z^2\ XY\ XZ\ YZ\ X\ Y\ Z\ \alpha]^T \quad \text{equation 13}$$

The corrected XYZ values $[XYZ_{Correct}]$ are obtained by the above variance matrix V in combination with the correction matrix C, as shown in the following equation 14:

$$[XYZ_{Correct}] = [C] \times [V] \quad \text{equation 14}$$

The average error of $[XYZ_{Correct}]$ and $[XYZ_{Spectrum}]$ in the white light images is 1.40.

The above calculation uses visible light bands ranging from 380 nm to 780 nm. Thus correction result of the endoscope is represented by color difference wherein $[XYZ_{Correct}]$ and $[XYZ_{Spectrum}]$ are converted to Lab color space to which CIE DE2000 corresponds. The following equations 15-17 are color space conversion functions.

$$L^* = 116 f\left(\frac{Y}{Y_n}\right) - 16 \quad \text{equation 15}$$

$$a^* = 500\left[f\left(\frac{X}{X_n}\right) - f\left(\frac{Y}{Y_n}\right)\right] \quad \text{equation 16}$$

$$b^* = 200\left[f\left(\frac{Y}{Y_n}\right) - f\left(\frac{Z}{Z_n}\right)\right] \quad \text{equation 17}$$

wherein $f(n)$ is as the below equation 18:

$$f(n) = \begin{cases} n^{\frac{1}{3}}, n > 0.008856 \\ 7.87n + 0.1379, \text{otherwise} \end{cases} \quad \text{equation 18}$$

The average value of color difference of the white light images before correction is 11.60 and the average value of color difference after correction is 2.84.

By PCA on 24-color reflection spectrum data $[R_{Spectrum}]$ of the reference image REF, main components of the 24-color reflection spectrum data $[R_{Spectrum}]$ are found out. Then perform multiple regression analysis of principal component scores corresponding to the main components and 24-color XYZ value $[XYZ_{Correct}]$ to get transformation matrix M.

In the multiple regression analysis of $[XYZ_{Correct}]$ and the principal component scores, a variable $V_{Color}$ is used because $V_{Color}$ matrix have listed all possible combinations of X, Y, and Z. After getting transformation matrix M in the equation 19, simulated spectrum $[S_{Spectrum}]$ can be calculated by $[XYZ_{Correct}]$ and equation 20.

$$[M] = [Score] \times pinv([V_{Color}]) \quad \text{equation 19}$$

$$[S_{Spectrum}]_{380\sim780nm} = [EV][M][V_{Color}] \quad \text{equation 20}$$

Lastly compare the 24-color simulated spectrum $[S_{Spectrum}]$ with the 24-color reflection spectrum data $[R_{Spectrum}]$ and calculate root-mean-square error (RMSE) of the respective colors. The average error of WLI is 0.057. A difference between the 24-color simulated spectrum $[S_{Spectrum}]$ and the 24-color reflection spectrum data $[R_{Spectrum}]$ can also be presented by color difference. The average color difference of WLI is 2.85. Thereby color error is hardly recognized by human eyes. Thus better color reproduction performance is provided when users need color reproduction. Thereby better hyperspectral images within visible wavelengths are simulated.

As shown in FIG. 2B, in the step S20, the host 10 checks whether resolution of the input image IMG reaches a resolution threshold such as 10 nm. Once the input image IMG reaches the resolution threshold of hyperspectral images, continue to run the step S30.

In the step S30, as shown in FIG. 2B, the host 10 converts the input images IMG to hyperspectral images HSI2 according to the hyperspectral image information HSI1 obtained in the step S10 and also gets spectral information SP1 of the hyperspectral images HSI2 at the same time.

In the step S40, as shown in FIG. 2C, as stated above, the host 10 selects a plurality of wave bands BND corresponding to esophageal cancer cells CELL and performs feature calculation FC on the spectral information SP1 to retrieve a plurality of corresponding feature images F1.

Figure 3:
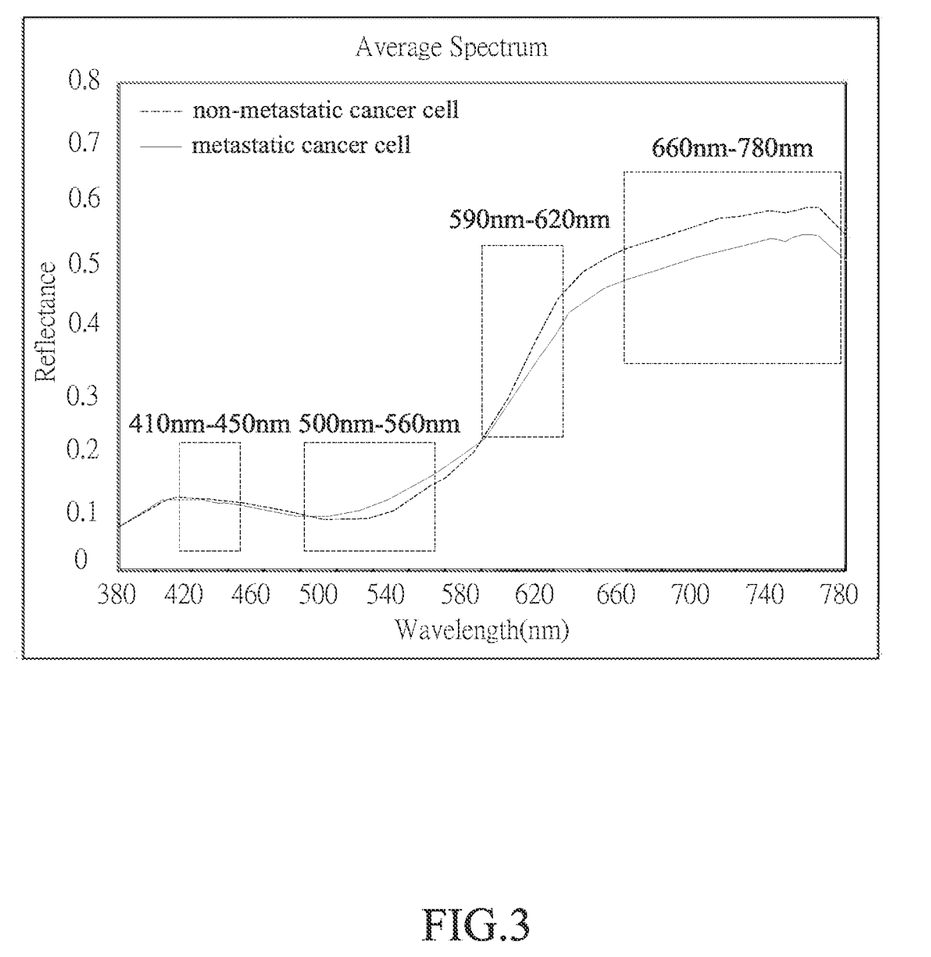
FIG. 3 is a curve chart showing comparison of sample spectra of sample images of an embodiment according to the present invention.

Refer to an average spectrum of sample spectra of sample images shown in FIG. 3, how the plurality of wave bands BND of the esophageal cancer cells CELL is selected is revealed. There are two curves, with metastasis and without metastasis. The two curves have a bit different at the wave band of 410 nm-450 nm while the difference at the wave bands of 500 nm-560 nm and 590 nm-620 nm is more obvious. Although the curves are similar to each other at the wave band of 660 nm-780 nm, the curves show the largest difference in values. Thereby the above wave bands are selected for more effective matching.

In the step S50, as shown in FIG. 2C, next the host 10 performs at least one layer of convolution VGG of the feature images F1 with a plurality of kernels 122 to get a convolution result R1.

As shown in FIG. 2D, in the step S60, the host 10 performs matching between the convolution result R1 and a plurality of sample spectra of a plurality of sample images SIM to generate a comparison result R2. In this embodiment, the convolution result R1 and the plurality of the sample spectra of the sample images SIM are matched by the host 10. The sample spectra of the sample images SIM include a plurality of spectra of metastatic esophageal cancer cells and a plurality of spectra of non-metastatic esophageal cancer cells. Once the convolution result R1 and the spectra of metastatic esophageal cancer cells are matched, the comparison result R2 showing metastasis of esophageal cancer cells is generated. If the convolution result R1 is matched with the spectra of non-metastatic esophageal cancer cells, the comparison result R2 showing non-metastasis of esophageal cancer cells is provided.

Step S70: the host 10 determines whether the esophageal cancer cells have spread to other parts of the body according to the comparison result R2. The host 10 determines metastasis of the esophageal cancer cells occurs when the comparison result R2 shows metastasis of esophageal cancer cells. Once the comparison result R2 shows non-metastasis of esophageal cancer cells, the host 10 determines the esophageal cancer cells don't spread out. When the host 10 determines that the esophageal cancer cells spread, the esophageal cancer cells spread to regional lymph nodes or tissues and organs at the remote end.

Figure 4:
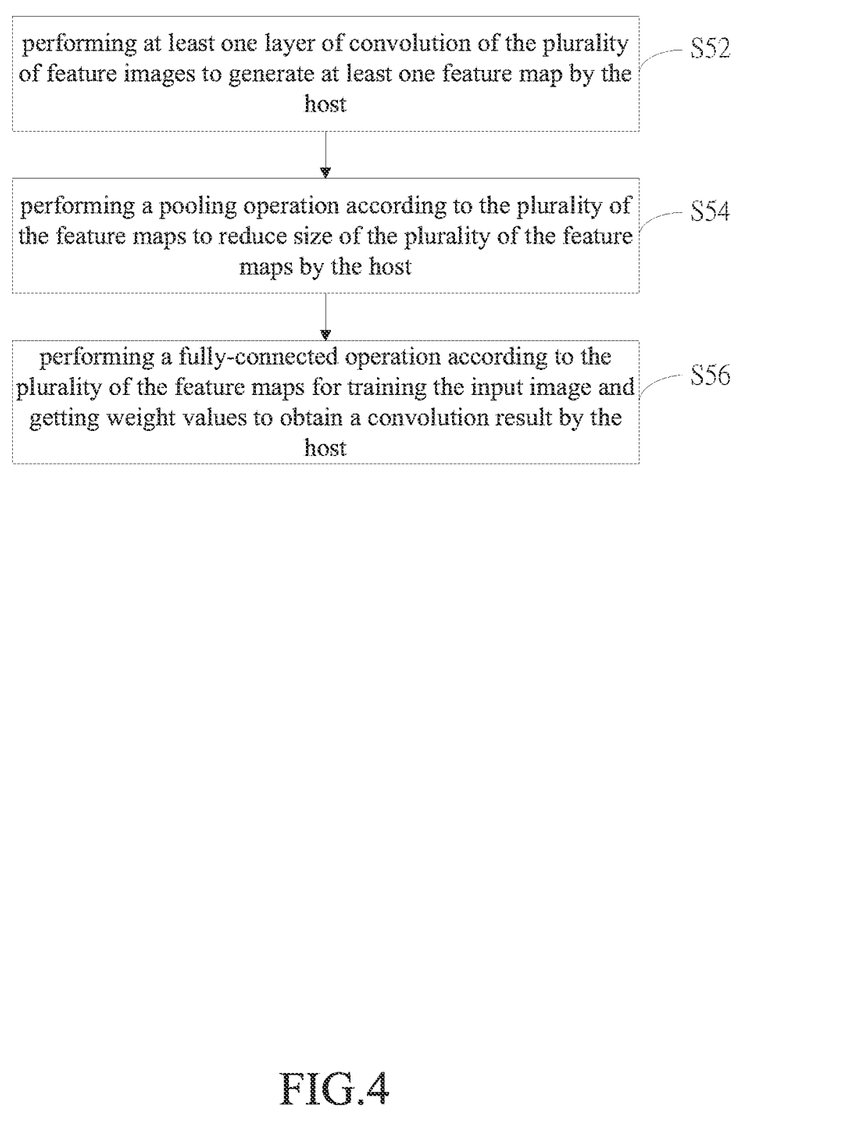
FIG. 4 is a flow chart showing steps of another embodiment according to the present invention.

As shown in FIG. 4, another embodiment is provided for explanation of convolution VGG and further including the following steps after the step S50.

Step S52: performing at least one layer of convolution of the plurality of feature images to generate at least one feature map by the host;

Step S54: performing a pooling operation according to the plurality of the feature maps to reduce size of the plurality of the feature maps by the host;

Step S56: performing a fully-connected operation according to the plurality of the feature maps for training the input image and getting weight values to obtain a convolution result by the host.

Figure 5:
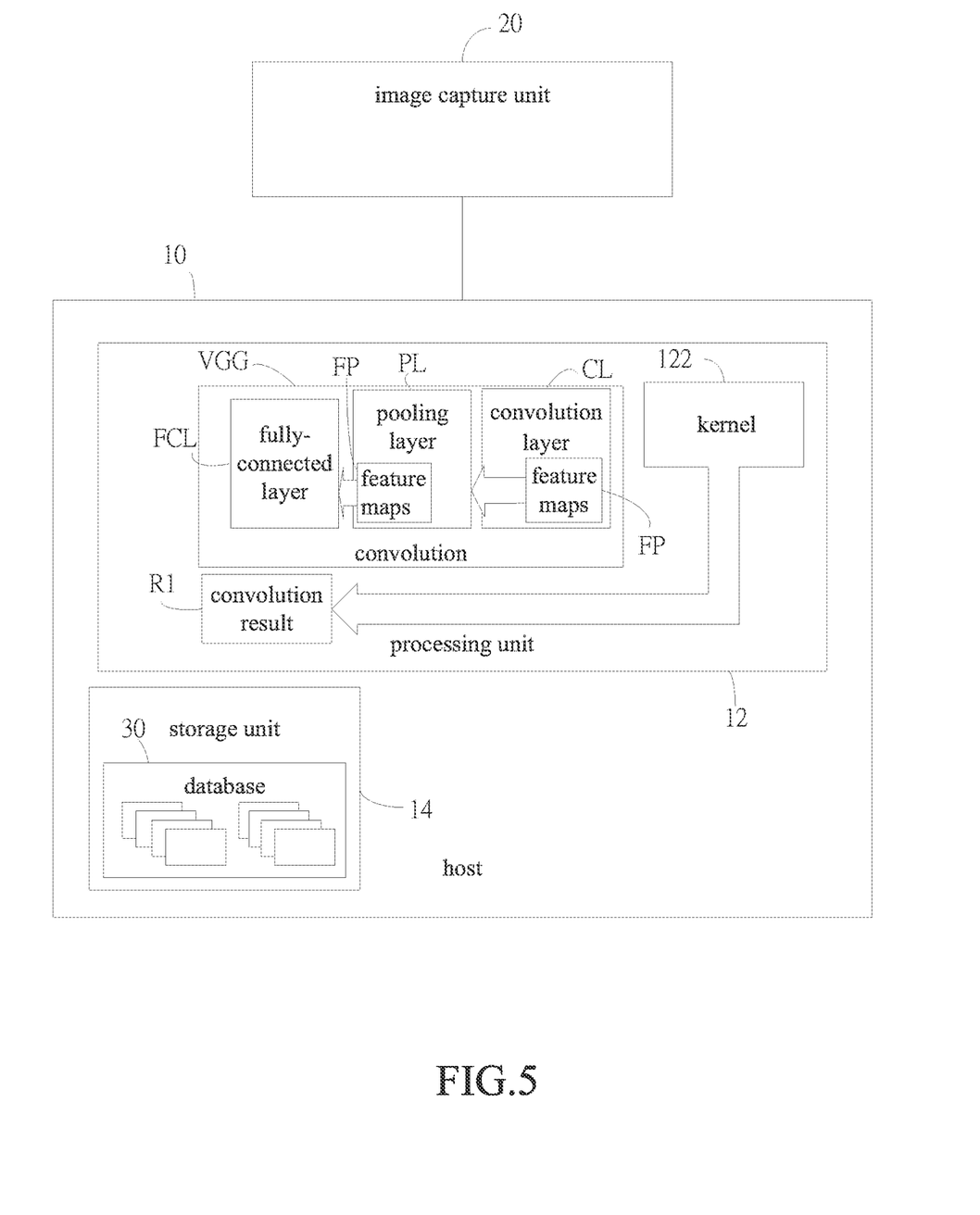
FIG. 5 is a schematic drawings showing steps of another embodiment according to the present invention.

As to the embodiment shown in FIG. 4 and FIG. 5, the host 10 performs operation of at least one convolution layer CL of a plurality of feature maps F1 to generate at least one feature map FP. Then the host performs operation of a pooling layer PL according to the feature maps FP to reduce size of the feature maps FP for reducing computation. Lastly the host 10 performs operation of a fully-connected layer FCL according to the plurality of the feature maps to get the convolution result R1.

Figure 6:
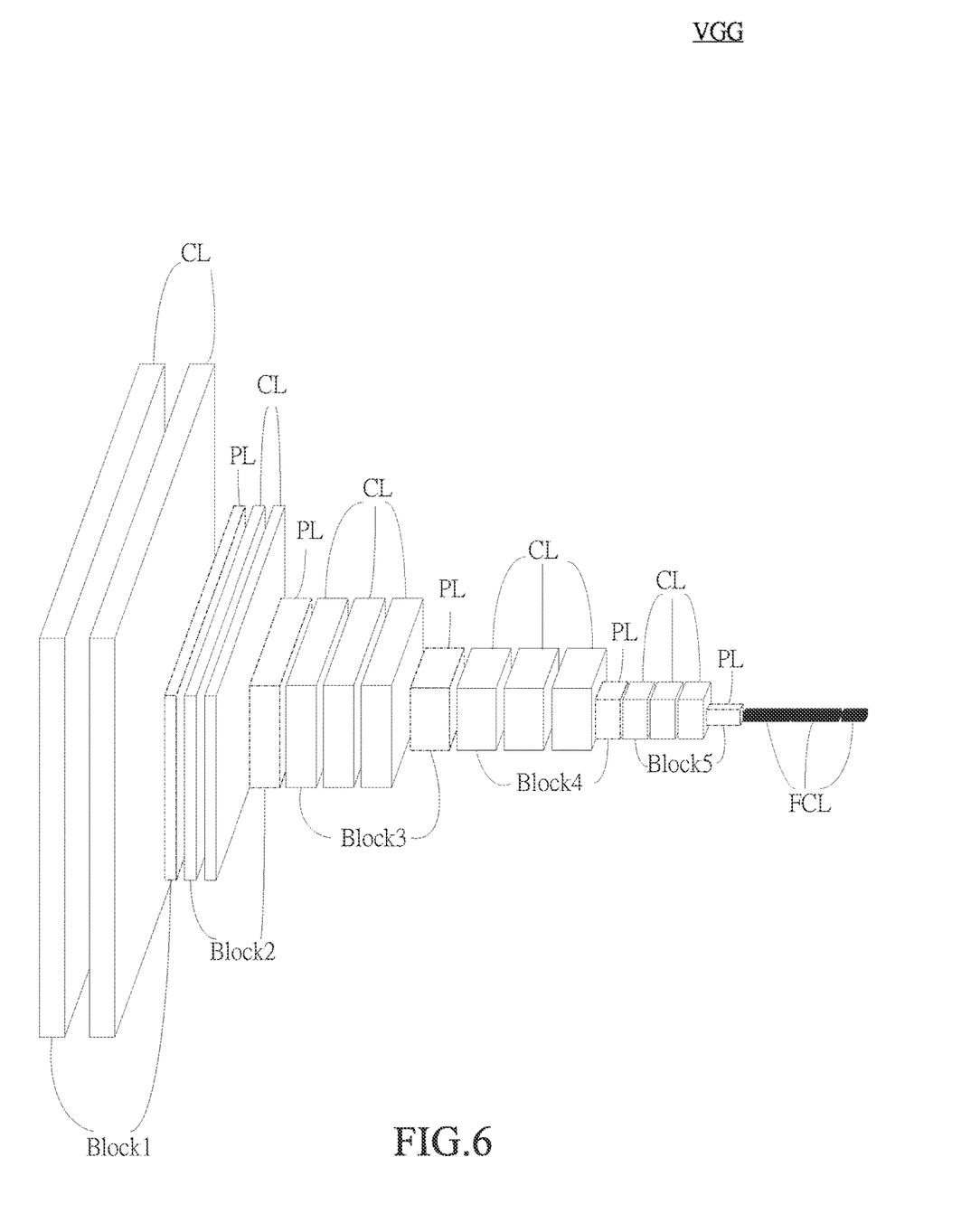
FIG. 6 is a schematic drawings showing structure of convolution of an embodiment according to the present invention.

Refer to FIG. 6, the convolution VGG consists of five blocks ranging from the first block Block 1 to the fifth block Block 5 and each of the blocks is composed of at least one convolution layer CL and one pooling layer PL, and connected with at least one fully-connected layer (FCL) lastly.

In a further embodiment of the present invention, a white-light image (WLI) captured by an esophagoscope is used to determine whether esophagus cancer cells CELL have spread. A host 10 captures the WLI as an input image IMG. Then hyperspectral images HSI are obtained from the input image IMG according to hyperspectral image information HSA. The hyperspectral images HIS have 401 bands in a region of 380 nm-780 nm. Thus wave bands BND of 410 nm-450 nm, 500 nm-560 nm, 590 nm-620 nm, and 660 nm-780 nm are selected to perform feature computation FC and create at least one feature image F1. Then the host 10 performs convolution VGG on the feature image F1 to get a convolution result R1. Next sample spectra of sample images SIM of metastatic esophageal cancer cells and sample spectra of sample images SIM of non-metastatic esophageal cancer cells stored in database 30 are transmitted to a processing unit 12 and matched with the convolution result R1. Once the convolution result R1 is matched with at least one of the sample spectra of at least one of the sample images SIM of metastatic esophageal cancer cells, the host 10 determines that metastasis of esophageal cancer cells occurs in the input image IMG. If the convolution result R1 is matched with at least one of the sample spectra of at least one of the sample images SIM of non-metastatic esophageal cancer cells, the host 10 determines that there is no metastasis of esophageal cancer cells in the input image IMG.

In summary, the present invention provides a method of determining whether metastasis of esophageal cancer cells occurs by using white-light endoscopes, which allows identification of metastasis of cancer cells more conveniently. Thereby medical staff can understand patient's conditions better and thus provide patients with accurate information and better care.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

The invention claimed is:

1. A method for image analysis of predicted cell metastasis comprising the steps of:
    performing principle component analysis (PCA) on a plurality of reference images and converting the reference images into a plurality of hyperspectral image information of a plurality of hyperspectral reference images by a host;
    capturing and sending at least one input image into the host by an image capture unit;
    converting the input image into a hyperspectral image according to the plurality of hyperspectral image information and getting a plurality of spectral information of the hyperspectral image by the host;
    selecting a plurality of wave bands corresponding to esophageal cancer cells according to the plurality of the spectral information and performing feature computation to generate a plurality of corresponding feature images by the host;
    performing at least one layer of convolution of the feature images with a plurality of kernels to get a convolution result by the host;
    performing matching between the convolution result and a plurality of sample spectra of a plurality of sample images to generate a comparison result by the host; and
    determining whether the esophageal cancer cells have spread to other parts of body according to the comparison result by the host.

2. The method as claimed in claim 1, wherein before the step of converting the input image into a hyperspectral image according to the plurality of hyperspectral image information and getting a plurality of spectral information of the hyperspectral image by the host, the method further includes a step of performing data cleaning of the input image by the host.

3. The method as claimed in claim 1, wherein the step of performing at least one layer of convolution of the feature images with a plurality of kernels to get a convolution result by the host further includes the steps of:
    performing at least one layer of convolution of the plurality of feature images to generate at least one feature map by the host;
    performing a pooling operation according to the feature maps to reduce size of the feature maps by the host; and
    performing a fully-connected operation according to the feature maps for training the input image and getting weight value to obtain a convolution result by the host.

4. The method as claimed in claim 1, wherein the hyperspectral image information is a plurality of white light images corresponding to the input image and composed of a plurality of color matching functions (CMF), a correction matrix, and a conversion matrix.

5. The method as claimed in claim 1, wherein in the step of performing matching between the convolution result and a plurality of sample spectra of a plurality of sample images to generate a comparison result by the host, the host reads the sample spectra of the sample images from a database and then matches the sample spectra with the convolution result.

6. The method as claimed in claim 1, wherein the sample spectra of the sample images are a plurality of spectra corresponding to the esophageal cancer cells of a plurality of endoscopic images.

7. The method as claimed in claim 1, wherein the sample spectra of the sample images include at least one sample spectrum of at least one image of metastatic esophageal cancer cells and at least one sample spectrum of at least one image of non-metastatic esophageal cancer cells.

8. The method as claimed in claim 7, wherein the comparison result is metastasis of the esophageal cancer cells when the convolution result is matched with the sample spectrum of the image of metastatic esophageal cancer cells; the comparison result is non-metastasis of the esophageal cancer cells when the convolution result is matched with the sample spectrum of the image of non-metastatic esophageal cancer cells.

9. The method as claimed in claim 1, wherein the wave bands include 415-450 nm, 500-560 nm, 590-620 nm, and 660-780 nm.

\* \* \* \* \*